United States Patent
Howe

(10) Patent No.: US 7,374,324 B2
(45) Date of Patent: May 20, 2008

(54) LED MOLDED LIGHT GUIDE

(75) Inventor: Brian Douglas Howe, Shelby Township, MI (US)

(73) Assignee: Dura Global Technologies, Inc., Rochester Hills, MI (US)

( * ) Notice: Subject to any disclaimer, the term of this patent is extended or adjusted under 35 U.S.C. 154(b) by 304 days.

(21) Appl. No.: 11/054,017

(22) Filed: Feb. 9, 2005

(65) Prior Publication Data

US 2006/0187668 A1  Aug. 24, 2006

(51) Int. Cl.
*B60Q 3/00* (2006.01)

(52) U.S. Cl. .................. 362/491; 362/27; 362/511

(58) Field of Classification Search .......... 362/26, 362/27, 602, 612, 491, 511; 340/456, 815.45; 116/28.1
See application file for complete search history.

(56) References Cited

U.S. PATENT DOCUMENTS

| | | | |
|---|---|---|---|
| 4,980,803 A * | 12/1990 | Richmond et al. ........... 362/23 |
| 5,512,875 A * | 4/1996 | Polityka .................... 340/456 |
| 5,696,483 A | 12/1997 | Khalid et al. .............. 340/456 |
| 5,896,010 A | 4/1999 | Mikolajczak et al. ......... 315/77 |
| 6,910,783 B2 * | 6/2005 | Mezei et al. ................ 362/615 |
| 2003/0189819 A1 * | 10/2003 | Furuya ....................... 362/26 |
| 2004/0095739 A1 * | 5/2004 | Parker et al. ................. 362/26 |

* cited by examiner

*Primary Examiner*—Stephen F Husar
*Assistant Examiner*—Peggy A. Neils
(74) *Attorney, Agent, or Firm*—Kevin S. MacKenzie; Gifford, Krass, Groh, Sprinkle..; Dean B. Watson

(57) ABSTRACT

A light guide for a transmission shifter assembly includes a light member having a top light transmitting surface, and a reflective bottom surface. The light member also includes first and second ends, as well as first and second sides. At least one light emitting diode is integrally formed with the light member. The light emitting diode produces light for backlighting the transmission shifter assembly.

13 Claims, 3 Drawing Sheets

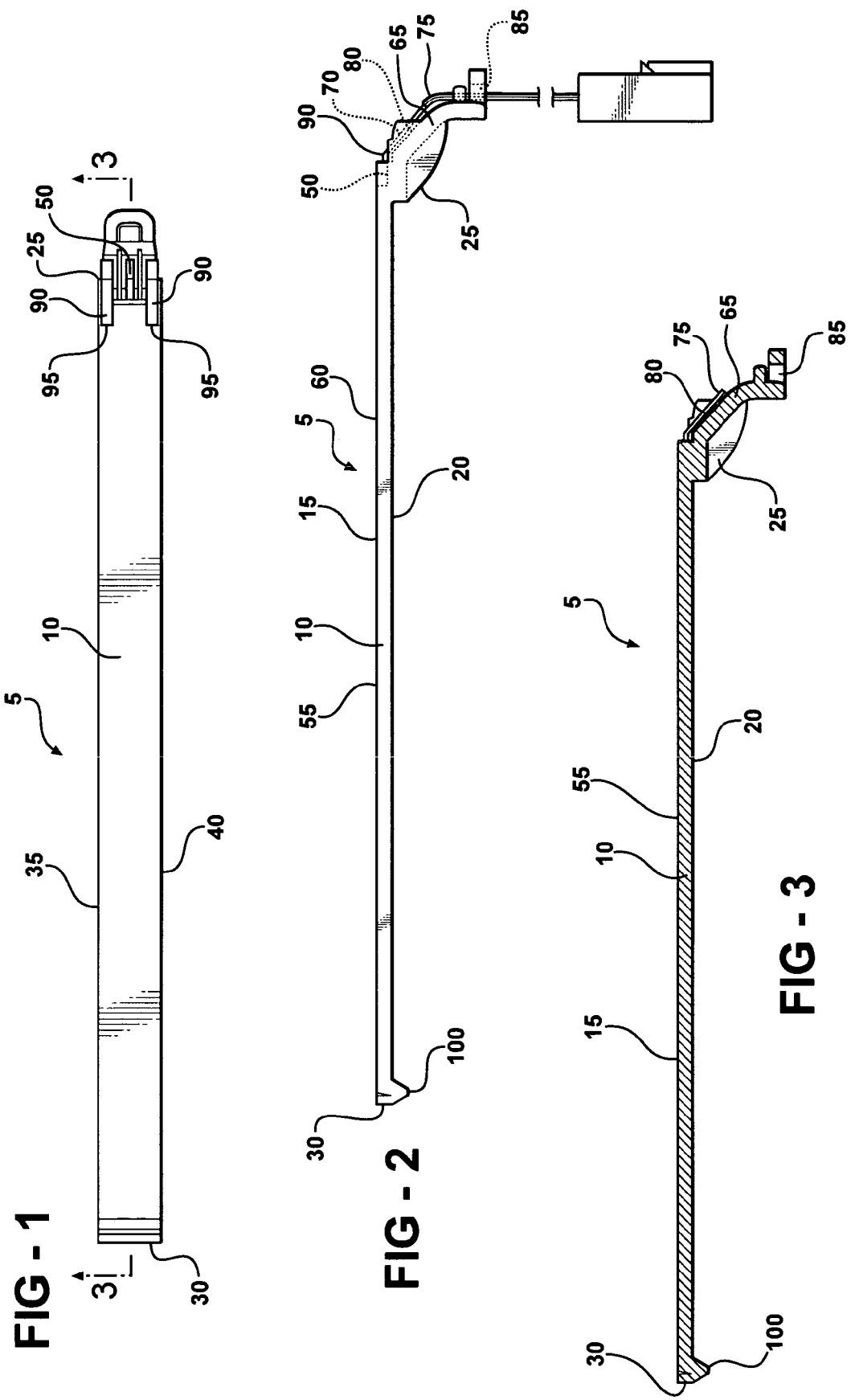

LED MOLDED LIGHT GUIDE

FIELD OF THE INVENTION

The invention relates to backlighting for automotive components, and more particularly to backlighting automatic transmission shifters.

BACKGROUND OF THE INVENTION

It is known in the art to- backlight automatic transmission shifters, particularly bezels associated with automatic transmission shifters, so that an operator of a vehicle can readily determine which gear is engaged. In the prior art, various examples of illumination or lighting indicators have been used for backlighting an automatic transmission. For example, it is known in the art to utilize incandescent bulbs which illuminate a sequence of translucent characters that indicate the sequence of positions on a shift lever. An additional indication feature is also provided by a separate translucent area underneath each character. In such systems a light emitting diode is confined to each concentrated translucent section and lights the associated area when the gear position is above that translucent area.

It is also known in the art to use a series of LEDs positioned under a character for each position of an automatic transmission shift lever. In this example, all of the LEDs are lit at a lower intensity except for an LED that is associated with the position of the shift lever which is illuminated with a higher intensity to indicate the position of the shift lever.

The prior art designs have several limitations including the use of incandescent light bulbs that generally have a short life in comparison to LED type lighting devices. Also, prior art designs utilizing many LED devices positioned along a shift lever lead to a high cost for lighting an automatic transmission shifter. There is therefore a need in the art for a light guide for an automatic transmission shifter that has a low cost, and a longer service life and energy efficiency than current prior art devices.

SUMMARY OF THE INVENTION

A light guide for a transmission shifter assembly includes a light member having a top light transmitting surface, and a reflective bottom surface. The light member also includes first and second ends, as well as first and second sides. At least one light emitting diode is integrally formed with the light member. The light emitting diode produces light for backlighting the transmission shifter assembly.

BRIEF DESCRIPTION OF THE DRAWINGS

FIG. 1 is a side view of a preferred embodiment of the light guide of the present invention;

FIG. 2 is a plan view of a preferred embodiment of the light guide of the present invention;

FIG. 3 is a partial sectional view taken along the line A-A in FIG. 2;

DETAILED DESCRIPTION OF THE PREFERRED EMBODIMENT

Figure 6:
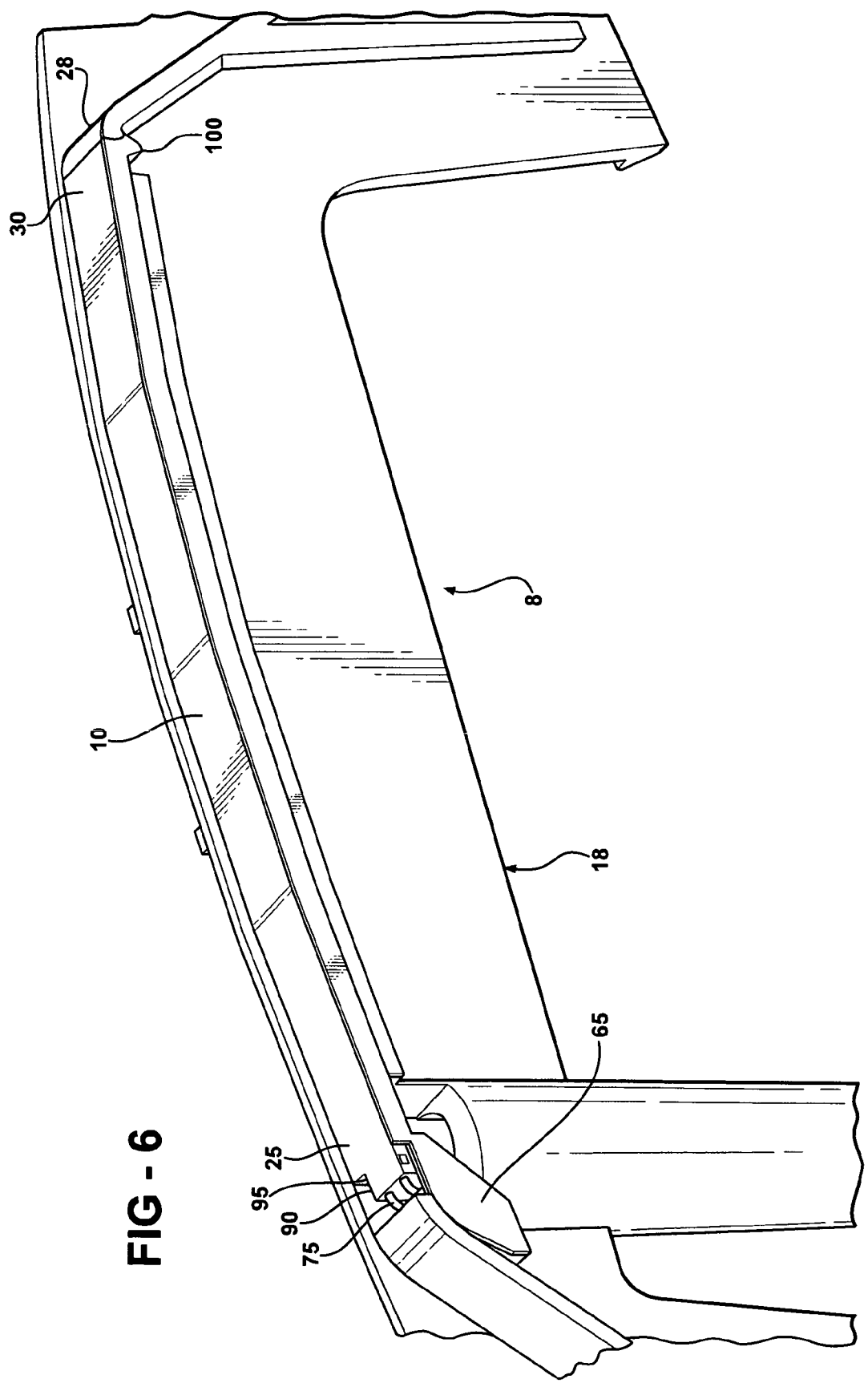
FIG. 6 is a sectional view detailing the light guide attached to a shifter assembly.

Referring to FIGS. 1 and 2, there is shown a preferred embodiment of a light guide 5 for transmission shifter assembly 8 of the present invention. The light guide 5 includes a light member 10 having a top light transmitting surface 15 and a bottom reflective surface 20. The light member 10 includes first and second ends 25, 30 spaced from each other, as well as first and second sides 35, 40 spaced from each other. At least one light emitting diode 50 is integrally formed with the light member 10 for backlighting the transmission shifter assembly 8. The transmission shifter assembly 8 preferably includes a light box 18 into which the light guide 5 is retained, as best seen in FIG. 6.

A central portion 55 disposed between the opposing first and second ends 25, 30 preferably includes a planar portion 60 defining the optical or light transmitting region of the light guide 5. As stated above, the light member 10 preferably includes a reflective bottom surface 20 which may be formed by polishing the bottom surface or applying a reflective layer, such as a reflective paper. The bottom surface 20 bounces light emitted by the diode 50 toward the top light transmitting surface 15 for backlighting the automatic transmission shifter.

As stated above, and as shown in FIG. 2, the at least one light emitting diode 50 is integrally formed with the light member 10. In a preferred embodiment, the at least one light emitting diode 50 is formed at a first end 25 of the light member 10. In a preferred aspect of the present invention, the light member 10 is formed of a suitable light transmitting material capable of being injection molded. Suitable materials include polycarbonate and Lexan®, as well as other plastic materials known in the art for use as a light transmitting material. The at least one diode 50 is preferably placed in an injection mold with the light member 10 being formed in the mold, such that the at least one light emitting diode 50 is integral with the light member 10.

Figure 4:
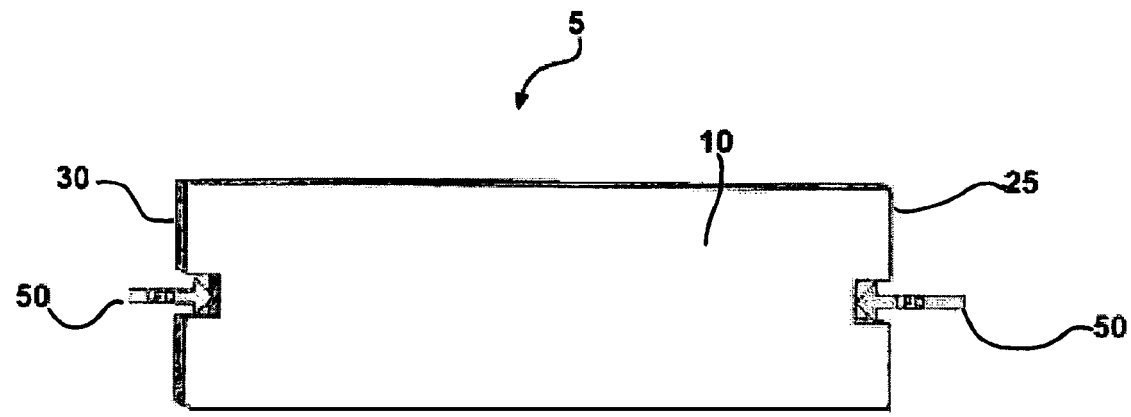
FIG. 4 is a schematic representation of an alternative embodiment of a light guide having light emitting diodes positioned at opposing ends.
Figure 5:
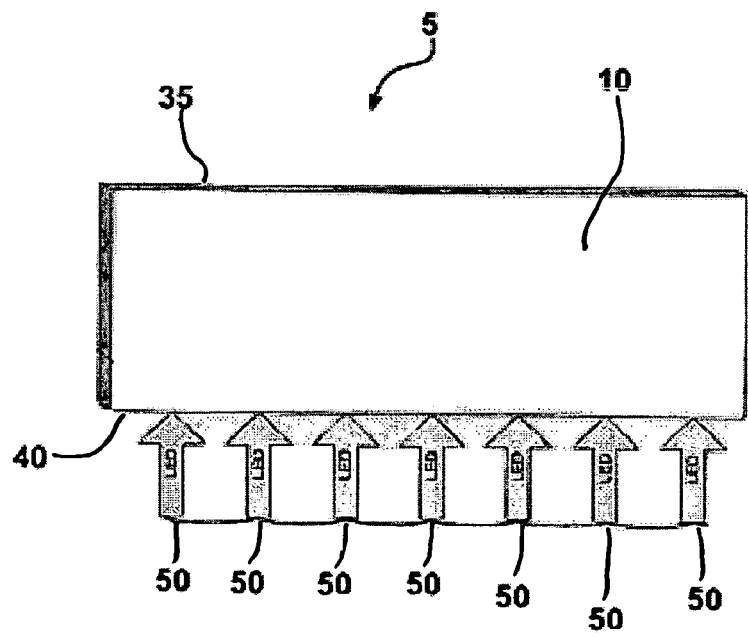
FIG. 5 is a schematic representation of an alternative embodiment of a light guide having light emitting diodes positioned along a side of the light guide.

Referring to FIG. 4, an alternative embodiment of a light guide 10 is shown wherein the at least one light emitting diode 50 is integrally formed at the first and second ends 25, 30 of the light member 10. Additionally, another alternative embodiment detailed in FIG. 5, includes a plurality of diodes 50 disposed on either of the first or second sides 35, 40 of the light member 10. It is to be understood that many variations including placing diodes 50 on both the sides and ends of the light member may be utilized by the present invention.

Returning to FIG. 2, the first end 25 of the light member 10 preferably includes a flange 65 formed thereon. The flange 65 is positioned adjacent the light emitting diode 50 and extends downward at an angle. The flange 65 preferably includes tension relief features 70 formed thereon for providing tension release to leads 75 connected to the at least one diode 50. As can be seen in FIG. 2, the leads 75 extend from the diode 50 along the flange 65 and contact the radiused ridge 80 and passes through the slot 85, both of which define the tension relief features 70 described above. In this manner, the leads 75 have protection against being broken from the diode 50 due to movement of the light guide 5 when it is installed in a transmission shifter assembly 8. The first end 25 of the light member 10 also includes a location feature 90 formed thereon for attaching the light member 10 to the transmission shifter assembly 8 described above, as best seen in FIG. 6. The location feature 90 preferably is a pair of snap tabs 95 disposed on either side of the leads and snap into a mating feature formed on the transmission shifter assembly 8.

The opposing second end 30 of the light member 10 includes a tab 100 formed thereon, again for attaching the light member 10 to the transmission shifter assembly 8. The tab 100 preferably snaps or locks into a slot or notch 28 formed on the transmission shifter assembly 8 to securely retain the light guide 5, as best seen in FIG. 6.

In the preferred embodiment described in FIGS. 1-3, a single LED 50 is molded integrally with a light member 10 to backlight the transmission shifter assembly 8. This design uses very little power in comparison to prior art designs utilizing incandescent bulbs and also has an increased service life in comparison to prior art designs. Any suitable light emitting diodes of various power and color characteristics can be utilized by the present invention. In a preferred aspect, an LED having a resistance of approximately 180 ohms and a chromaticity in both the X and Y directions of approximately 0.31 may be utilized by the present invention. A connector for mating with the leads 75 extending from the at least one light emitting diode 50 couples the diode 50 to a power supply for illuminating the diode 50. It should be realized that various types of connectors may be utilized by the present invention including integrally formed connectors formed on the first end 25 of the light member 10.

The invention has been described in an illustrative manner. It is to be understood that the terminology which has been used is intended to be in the nature of words of description rather than limitation. Many modifications and variations of the invention are possible in light of the above teachings. Therefore, within the scope of the appended claims, the invention may be practiced other than as specifically described.

The invention claimed is:

1. A light guide for a transmission shifter assembly comprising:
    a one piece light member having a top light transmitting surface, a reflective bottom surface, first and second ends, and first and second sides; and
    at least one light emitting diode integrally formed with the fight member for backlighting the transmission shifter assembly; wherein the light guide includes location and retention features providing mechanical location and attachment of the light guide relative to the transmission shifter assembly; and wherein the light guide includes tension relief features formed thereon preventing damage to leads connected to the at least one diode wherein the tension relief features include a radiused ridge and slot formed proximate the at least one diode for accommodating movement of the light guide relative to the transmission shifter assembly.

2. The light guide of claim 1 wherein the at least one light emitting diode is integrally formed at the first end of the light member.

3. The light guide of claim 1 wherein the at least one light emitting diode is integrally formed at the second end of the light member.

4. The light guide of claim 1 wherein the at least one light emitting diode is integrally formed at the first and second ends of the light member.

5. The light guide of claim 1 wherein the at least one light emitting diode comprises a plurality of diodes.

6. The light guide of claim 5 wherein the plurality of light emitting diodes is disposed on either of the first or second sides of the light member.

7. The light guide of claim 1 wherein the light member location and retention features includes a tab formed thereon for attaching the light member to the transmission shifter assembly.

8. The light guide of claim 1 wherein the first end of the light member includes a flange formed thereon.

9. The light guide of claim 1 wherein the light member location and retention features includes integrally formed snap tabs thereon for attaching the light member to the transmission shifter assembly.

10. A light guide for an automatic transmission shifter comprising:
    a one piece light member having a top light transmitting surface, a reflective bottom surface, first and second ends, and first and second sides; and
    at least one light emitting diode integrally formed at the first and second ends of the light member for backlighting the transmission shifter assembly wherein the light guide includes location and retention features providing mechanical location and attachment of the light guide relative to the transmission shifter assembly: and wherein the light guide includes tension relief features formed thereon preventing damage to leads connected to the at least one diode wherein the tension relief features include a radiused ridge and slot formed proximate the at least one diode for accommodating movement of the light guide relative to the transmission shifter assembly.

11. A transmission shifter assembly comprising:
    a light box;
    a one piece light guide retained in the light box, the light guide including a light member having a top light transmitting surface, a reflective bottom surface, first and second ends, and first and second sides;
    the light guide including location and retention features for mechanically positioning and attaching the light guide relative to the light box without the use of additional fasteners or attachment operations and
    at least one light emitting diode integrally formed with the light member.

12. The transmission shifter assembly of claim 11 wherein the second end of the light member includes a tab formed thereon for attaching the light member to the transmission shifter assembly.

13. The transmission shifter assembly of claim 11 wherein the first end includes integrally formed retention features thereon for attaching the light member to the transmission shifter assembly.

* * * * *